(12) United States Patent
Sutter et al.

(10) Patent No.: US 7,607,336 B2
(45) Date of Patent: Oct. 27, 2009

(54) METHOD FOR DETERMINING THE INDIVIDUAL CONTROL VOLTAGE OF A PIEZOELECTRIC ELEMENT

(75) Inventors: Kai Sutter, Stuttgart (DE); Andreas Rau, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 478 days.

(21) Appl. No.: 10/552,395

(22) PCT Filed: Feb. 23, 2004

(86) PCT No.: PCT/EP2004/050187

§ 371 (c)(1),
(2), (4) Date: Aug. 18, 2006

(87) PCT Pub. No.: WO2004/090314

PCT Pub. Date: Oct. 21, 2004

(65) Prior Publication Data

US 2007/0000303 A1    Jan. 4, 2007

(30) Foreign Application Priority Data

Apr. 7, 2003    (DE) .................................. 103 15 815

(51) Int. Cl.
*G01F 19/00*    (2006.01)
(52) U.S. Cl. ....................................................... 73/1.74
(58) Field of Classification Search ....................... None
See application file for complete search history.

(56) References Cited

U.S. PATENT DOCUMENTS

| 6,133,714 A | 10/2000 | Freudenberg et al. |
| 2002/0041475 A1 | 4/2002 | Gangi et al. |

FOREIGN PATENT DOCUMENTS

| DE | 199 30 309 | 1/2001 |
| DE | 100 32 022 | 1/2002 |
| EP | 1 138 902 | 10/2001 |
| EP | 1 138 909 | 10/2001 |

*Primary Examiner*—Robert R Raevis
(74) *Attorney, Agent, or Firm*—Kenyon & Kenyon LLP

(57) ABSTRACT

In a method for ascertaining the control voltage of a piezoelectric element, the voltage drop at the piezoelectric element following a charge process is measured and the control voltage of the piezoelectric element is inferred from this voltage drop.

12 Claims, 3 Drawing Sheets

Correlation

METHOD FOR DETERMINING THE INDIVIDUAL CONTROL VOLTAGE OF A PIEZOELECTRIC ELEMENT

BACKGROUND INFORMATION

Piezoelectric elements are used, for example, as piezo injectors in injection systems for motor vehicles. They are charged to a specific voltage that is proportional to a lift of the piezoelectric element. Transmitted with the aid of a hydraulic coupler, this lift actuates an injection valve. To ensure the full functionality of such a piezo injector, the control voltage for every operating point, for example in the case of an injection system for a motor vehicle for every pressure in the common-rail system, for every temperature and the like, must be selected in such a way that the control valve opens and remains in the open position for the duration of the injection cycle.

In the method described in German Patent Application No. DE 100 32 022, for example, the control voltage, which is individual in every piezoelectric element (individual control voltage), is ascertained by indirectly measuring the pressure in the hydraulic coupler prior to the injection process. From the pressure induced by the hydraulic coupler in the piezo actuator, a corresponding piezo voltage in the actuator is inferred.

Furthermore, methods are also known in which the voltage is varied in certain regions and at the same time the injection quantity is measured. The operativeness of the piezoelectric element is inferred from the measured injection quantity.

A method and a circuit for the time-dependent measurement of the voltage along a piezoelectric element emerges for example from European Patent Application No. EP 1 138 902.

When manufacturing piezo elements that are used in common-rail diesel injection systems, it is necessary to adhere to very narrow tolerances in the manufacture of such piezo common-rail injectors so as to yield the highest possible output in the series. Very important for this purpose is the interaction between the piezo actuator and the hydraulic system, for example, in the form of the hydraulic coupler. Since in injectors of this kind no sensors can be used for reasons of costs, only little information is available regarding the dynamic behavior of piezo injectors.

Until now, changes of piezo actuators as a result of aging, for example, an aging of the piezo ceramics or the breaking of valve seats, can only be compensated at least partially by previously defined characteristics maps, which are stored for example in a control unit of an internal combustion engine.

An objective of the present invention is to ascertain, in a manner that is technically as simple as possible and as cost-effective as possible, the individual control voltage of piezo elements, particularly piezo injectors used particularly in diesel common-rail injection systems. In so doing, the dynamics of an individual control voltage, which changes over the service life of a piezo injector, is to be taken into account as well.

SUMMARY OF THE INVENTION

This objective is achieved by a method for determining the individual control voltage of a piezoelectric element according to the present invention.

A basic idea of the present invention is to use the piezo actuator and thus the piezo ceramics itself as a sensor, thereby rendering additional sensors superfluous. Rather, the voltage drop at the piezoelectric element following a charge process is measured and the individual control voltage of the piezoelectric element is inferred from this voltage drop itself.

In a very advantageous specific embodiment of the present invention, the voltage applied at the piezoelectric element is measured immediately following a charge process and the voltage applied at the piezoelectric element is measured immediately before a discharge process following the charge process and are subtracted from each other, and the individual control voltage of the piezoelectric element is inferred from this difference. As a result, a complex and cost-intensive ascertainment of the individual control voltage, for example by varying the control voltage, may be omitted.

For this purpose, the individual control voltage is advantageously gathered from a characteristic representing the relation between the difference and the individual control voltage.

This characteristic is preferably ascertained experimentally on the basis of a large number of measurements on different piezoelectric elements and is stored for example in a control unit of a motor vehicle.

Another very advantageous refinement of the method provides for the voltage applied at the piezoelectric element during the charge process to be increased iteratively until the voltage applied at the piezoelectric element immediately following the charge process does not deviate from the voltage applied at the piezoelectric element immediately prior to the subsequent discharge process and for the voltage thus ascertained to be rated as the individual voltage requirement.

Another advantageous refinement of the method provides for the piezoelectric element to have only one voltage applied to it and for the charge time to be iteratively increased until the voltage applied at the piezoelectric element immediately following the charge process does not deviate from the voltage applied at the piezoelectric element immediately prior to the discharge process and for the voltage thus ascertained to be rated as the individual control voltage. Preferably, the iterative increase of the voltage applied to the piezoelectric element and the measurement of the voltage at the piezoelectric element immediately prior to the discharge process occur at low pressures of the fluid to be injected. The voltage characteristic is preferably measured continuously at the piezoelectric element.

DETAILED DESCRIPTION

Figure 1:
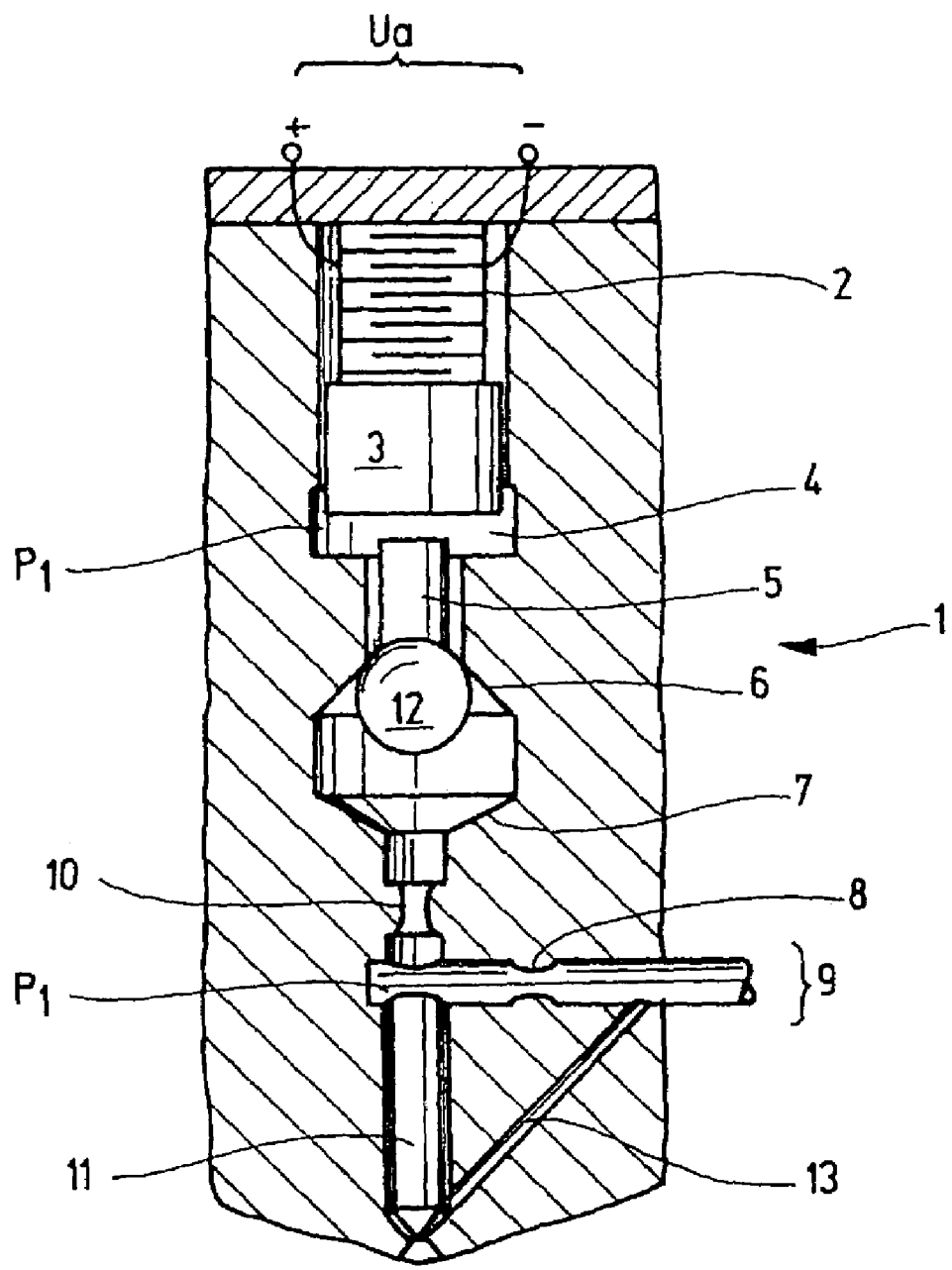
FIG. 1 shows the schematic structure of an injection valve known from the related art.

FIG. 1 shows a schematic representation of an injection valve 1 known from the related art having a central bore hole. In the upper part, an operating piston 3 having a piezoelectric actuator 2 is inserted into the central bore hole, operating piston 3 being rigidly connected to actuator 2. Toward the top, operating piston 3 terminates a hydraulic coupler 4, while toward the bottom an opening having a connecting channel to a first seat 6 is provided, in which a piston 5 having a valve closing element 12 is situated. Valve closing element 12 takes the form of a double-closing control valve. It closes first seat 6 if actuator 2 is in the rest phase. When operating actuator 2, that is, when applying a control voltage Ua to the terminals +,−, actuator 2 activates operating piston 3 and via hydraulic coupler 4 pushes piston 5 together with the closing element 12 in the direction of a second seat 7. Below the second seat, a nozzle needle 11 is situated in a corresponding channel, which closes or opens the outlet in a high-pressure channel (common-rail pressure) 13 depending on which control voltage $U_a$ is applied. The high pressure is supplied through the medium to be injected, for example fuel for an internal combustion engine, via an inlet 9, while the inflow quantity of the medium in the direction of nozzle needle 11 and hydraulic coupler 4 is controlled via a inlet throttle 3 and an outlet throttle 10. In this context, the task of hydraulic coupler 4 is to reinforce the lift of piston 5 on the one hand and on the other to decouple the control valve from the static temperature expansion of actuator 2. The recharging of coupler 4 is not shown here.

The mode of operation of this injection valve will be explained in more detail below. In each triggering of actuator 2, operating piston 3 is moved in the direction of hydraulic coupler 4. In the process, piston 5 together with closing element 12 also moves in the direction of second seat 7. Via a leakage gap, a portion of the medium contained in hydraulic coupler 4, for example fuel, is pressed out in the process. Between two injections, therefore, hydraulic coupler 4 must be refilled to maintain its functional reliability.

A high pressure prevails via inlet channel 9, which in the common-rail system, for example, may amount to between 200 and 2000 bar. This pressure acts against nozzle needle 11 and keeps it closed such that no fuel is able to emerge. If now as a consequence of control voltage $U_a$, actuator 2 is operated and closing element 12 is thereby moved in the direction of the second seat, then the pressure in the high pressure area decreases and nozzle needle 11 frees the injection channel. $P_1$ indicates the so-called coupler pressure as it is measured in hydraulic coupler 4. Without control $U_a$, a stationary pressure P sets in in coupler 4, which, for example, amounts to/1;10 of the pressure in the high-pressure part. Following the discharge of actuator 2, coupler pressure $P_1$ is approximately 0 and is raised again by recharging.

A change in the length of piezoelectric actuator 2 is achieved by applying a current to piezoelectric actuator 2 in a first time interval $\Delta t_1$. First time interval $\Delta t_1$ is the charge process of piezoelectric actuator 2. In this interval, piezoelectric actuator 2 is charged to a maximum voltage $U_{max}$. The discharge process of the piezoelectric actuator occurs in another time interval $\Delta t_2$ (see FIG. 2). In a third time interval $\Delta t_3$, lying between these two intervals, piezoelectric actuator 2 acts like a sensor in which any changes in length/force result in changes in voltage. The time characteristic of the voltage during interval $\Delta t_3$ now depends on what voltage is applied to piezoelectric actuator 2 immediately following the charge process, that is, at the end of interval $\Delta t_1$. In extensive series of measurements it was determined that the voltage decreases continuously until it asymptotically approaches a voltage, immediately prior to the discharge process, designated in FIG. 3 as $U_{Regel}$.

In an advantageous specific embodiment, the voltage difference $\Delta U$ between the maximum voltage $U_{max}$ and the voltage immediately prior to the discharge process $U_{Regel}$ is now measured. This voltage difference results from the fact that after switching off the charge current, operating piston 3 still travels a distance since piezoelectric actuator 2 expands further. If this voltage difference $\Delta U$ is large, for example, then the control valve must still travel a large distance after the charge current has been switched off, which causes the voltage in the sensory region of piezoelectric actuator 2 to drop more considerably since actuator 2 expands further than is the case in an injector in which closing element 12 is already very close to second seat 7 due to operating piston 3. In this case $\Delta U$ is small.

Figure 3:
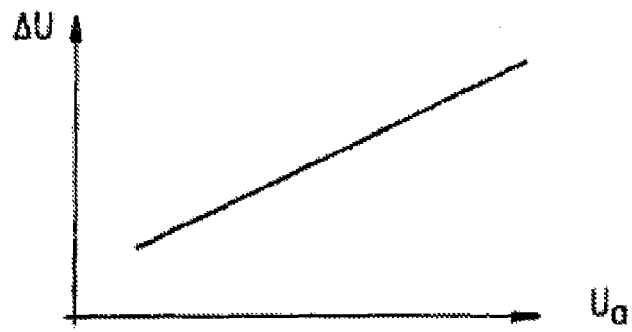
FIG. 3 shows the relation between the voltage change and the individual control voltage of a piezoelectric element.

Series of measurements have shown that voltage difference $\Delta U$ correlates to the individual voltage requirement of the injector. Such piezoelectric actuators 2 therefore require an individual control voltage $U_a$ because the seat diameter, the actuator lift, the friction etc. are subject to deviations that affect the voltage requirement. If the voltage difference $\Delta U$ is large, then the voltage requirement of the piezoelectric actuator is greater than in the case of a small voltage difference. Such an injection valve behaves accordingly in temperature changes. If the temperature rises, then the voltage requirement increases and the voltage difference increases accordingly. The individual control voltage $U_a$ is now ascertained by measuring the voltage difference and determining from this, for example on the basis of a characteristic curve as shown in FIG. 3, the individual control voltage $U_a$. Using a single measurement, for example during the flushing process in the mass production of injection valves 1, this makes it possible to determine the individual voltage requirement of the injector.

Figure 4:
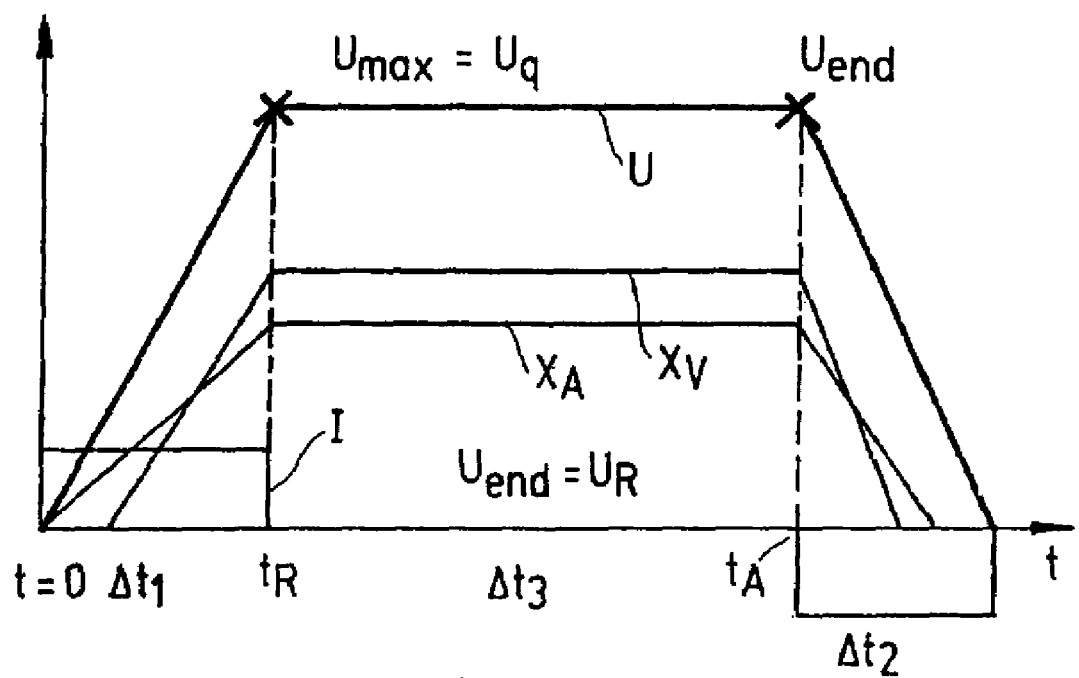
FIG. 4 shows a schematic representation of temporal voltage characteristics for explaining the measurement of the individual control voltage of a piezoelectric element according to a further exemplary embodiment of the present invention.

Another exemplary embodiment of the present invention is explained in more detail below in connection with FIG. 4.

Figure 2:
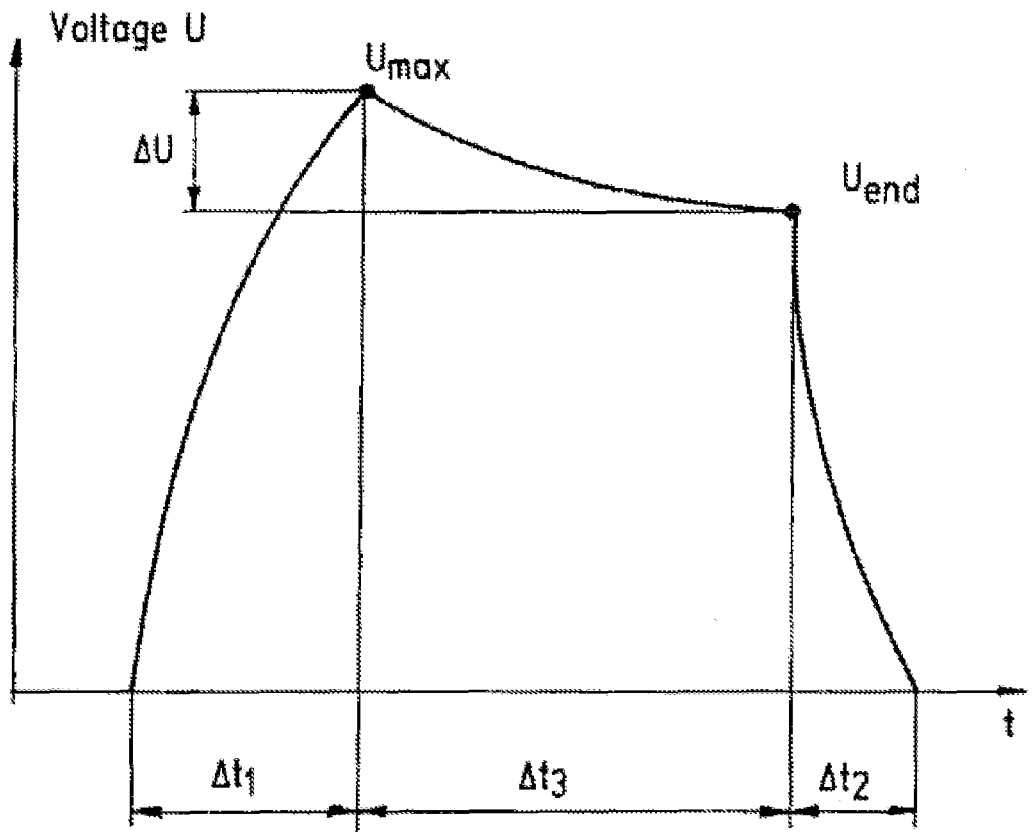
FIG. 2 shows a schematic representation of the voltage plotted against the control time when charging and discharging a piezoelectric element according to the present invention.

In the example shown in FIG. 2—as mentioned above—ball valve 12 at the end of the charge process has not yet arrived at second seat 7. Rather, ball valve 12 continues to move, piezoelectric actuator 2 continues to expand at constant load, which causes the voltage to drop as shown schematically in FIG. 2.

Another refinement of the method now provides for voltage $U_{max}$ to continue to increase continuously until at the end of the discharge process it does not change anymore. For this purpose, the voltage is ideally increased at low pressures in small increments. The injection quantity is hereby influenced only very little such that the operation of injection valve 1 is not disturbed. As soon as voltage $U_{max}$ applied at the piezoelectric element has assumed a value corresponding to the individual voltage requirement, the voltage no longer changes in interval $\Delta t_3$ such that the voltage characteristic assumes the trapezoidal shape shown schematically in FIG. 4. In this case, the voltage $U_{max}$ applied at piezoelectric actuator 2 following the charge process corresponds to the individual voltage requirement which may be stored, for example, in a control unit. A further increase of voltage $U_{max}$ applied at piezoelectric actuator 2 following the discharge process would now no longer effect any change in the voltage characteristic. From the voltage requirement, it is now possible to ascertain, via a characteristic for example, the individual control voltage, which defined for energetic reasons for example is decreased.

In a further exemplary embodiment, voltage $U_{max}$ applied to the piezoelectric actuator is kept constant and the charge time, that is, the magnitude of the interval $\Delta t_1$ is varied, that is, in particular it is increased by increments in order to ascertain the characteristic point of the voltage, that is, to ascertain the voltage at which the voltage applied at piezoelectric actuator 2 following the charge process practically does not change any more in interval $\Delta t_3$.

In all of the refinements of the method according to the present invention described above it is advantageous that the individual control voltage $U_a$ may be ascertained without additional sensors and that moreover it also allows for conclusions regarding the dynamic behavior of injection valve 1 during its operation, for if, for example, the injection valve is operated at the characteristic point, that is, at the point when the voltage $U_{max}$ applied at the piezoelectric actuator 2 following the discharge process does not change anymore, it is ensured that ball valve 12 has reached second seat 7.

What is claimed is:

1. A method for determining a control voltage of a piezoelectric element, comprising:
   sensing a voltage drop at the piezoelectric element after a charge process, the sensing of the voltage drop including:
      measuring a first voltage at the piezoelectric element immediately following the charge process;
      measuring a second voltage at the piezoelectric element immediately prior to a subsequent discharge process; and
      subtracting the first and second voltages from each other to provide a difference; and
   determining the control voltage of the piezoelectric element from the difference.

2. The method according to claim 1, wherein the control voltage is obtained from a characteristic curve which represents a relationship between the difference and the control voltage.

3. The method according to claim 2, wherein the relationship provides that, for a rise in the difference, there is a rise in the control voltage.

4. A method for ascertaining a control voltage of a piezoelectric element, the method comprising:
   measuring a first voltage applied at the piezoelectric element following a charge process;
   measuring a second voltage applied at the piezoelectric element prior to a subsequent discharge process;
   subtracting the first and second applied voltages from each other to provide a difference;
   inferring the control voltage of the piezoelectric element from the difference, wherein the control voltage is inferred from a characteristic representing a relation between the difference and the control voltage; and
   ascertaining the characteristic experimentally on the basis of a large number of measurements at different actuators.

5. A method for ascertaining an individual control voltage of a piezoelectric element, the method comprising:
   measuring a voltage drop at the piezoelectric element following a charge process;
   increasing the voltage applied at the piezoelectric element during the charge process iteratively until a voltage applied at the piezoelectric element immediately following the charge process does not deviate from a voltage applied at the piezoelectric element immediately prior to a subsequent discharge process; and
   rating the voltage as an individual voltage requirement, from which the individual control voltage of the piezoelectric element is inferred.

6. The method according to claim 5, wherein the iterative increase of the voltage applied to the piezoelectric element and the measurement are conducted at low pressures of a fluid to be injected.

7. The method according to claim 6, further comprising continuously measuring a voltage characteristic at the piezoelectric element.

8. The method according to claim 5, further comprising continuously measuring a voltage characteristic at the piezoelectric element.

9. A method for ascertaining a control voltage of a piezoelectric element, the method comprising:
   measuring a voltage drop at the piezoelectric element following a charge process;
   inferring the control voltage of the piezoelectric element from the voltage drop;
   applying only one voltage to the piezoelectric element; and
   increasing a charge time iteratively until a voltage applied at the piezoelectric element immediately following the charge process does not deviate from a voltage applied at the piezoelectric element immediately prior to a subsequent discharge process.

10. The method according to claim 9, further comprising continuously measuring a voltage characteristic at the piezoelectric element.

11. A method for ascertaining a control voltage of a piezoelectric element, the method comprising:
    measuring a voltage drop at the piezoelectric element following a charge process;
    applying only one voltage to the piezoelectric element; and
    inferring the control voltage of the piezoelectric element by increasing a charge time iteratively until a voltage applied at the piezoelectric element immediately following the charge process does not deviate from a voltage applied at the piezoelectric element immediately prior to a subsequent discharge process.

12. The method according to claim 11, further comprising continuously measuring a voltage characteristic at the piezoelectric element.

* * * * *

UNITED STATES PATENT AND TRADEMARK OFFICE
CERTIFICATE OF CORRECTION

PATENT NO. : 7,607,336 B2 Page 1 of 1
APPLICATION NO. : 10/552395
DATED : October 27, 2009
INVENTOR(S) : Sutter et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 738 days.

Signed and Sealed this

Twelfth Day of October, 2010

David J. Kappos
*Director of the United States Patent and Trademark Office*